United States Patent [19]

Gilhart

[11] Patent Number: 4,582,742

[45] Date of Patent: Apr. 15, 1986

[54] HIGH-TEMPERATURE FIBROUS INSULATION MODULE

[76] Inventor: Jack S. Gilhart, 28591 King Rd, Salem, Ohio 44460

[21] Appl. No.: 703,809

[22] Filed: Feb. 21, 1985

[51] Int. Cl.[4] .......................... B32B 3/14; B32B 5/08; F27D 1/00

[52] U.S. Cl. .................................... 428/119; 428/138; 428/193; 428/920; 428/49; 432/247; 110/336

[58] Field of Search ............... 428/119, 138, 920, 193, 428/49; 432/247; 110/336

[56] References Cited

U.S. PATENT DOCUMENTS

| | | | |
|---|---|---|---|
| 3,940,244 | 2/1976 | Sauder et al. | 432/247 |
| 4,238,257 | 12/1980 | Remi et al. | 428/920 X |
| 4,524,702 | 6/1985 | Miller et al. | 110/336 X |

*Primary Examiner*—Alexander S. Thomas
*Attorney, Agent, or Firm*—Pearne, Gordon, Sessions, McCoy, Granger & Tilberry

[57] ABSTRACT

A modular, block-shaped insulating unit for use in an insulating system for the interior of a high-temperature furnace or the like. The module comprises a plurality of short, ropelike lengths formed of braided strands, assembled in side-by-side relation to form a bundle. The strands are formed of twisted, generally parallel ceramic fibers spun into cords and assembled or braided into a rope, which is then cut into generally equal lengths. The lengths are retained in a tightly compacted condition whereby the ends of the fibers define a front planar face of the module, with the fibers being aligned in a generally perpendicular orientation relative to the front planar face.

10 Claims, 5 Drawing Figures

FIG. 1
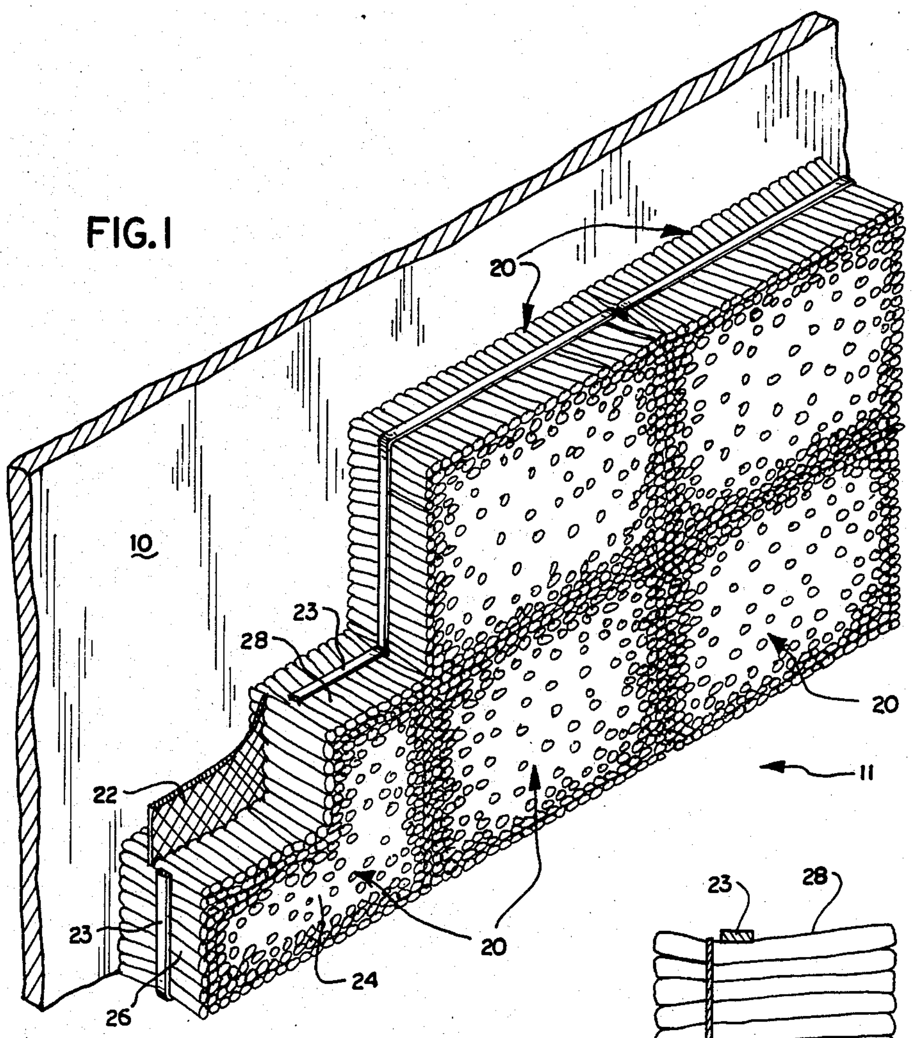
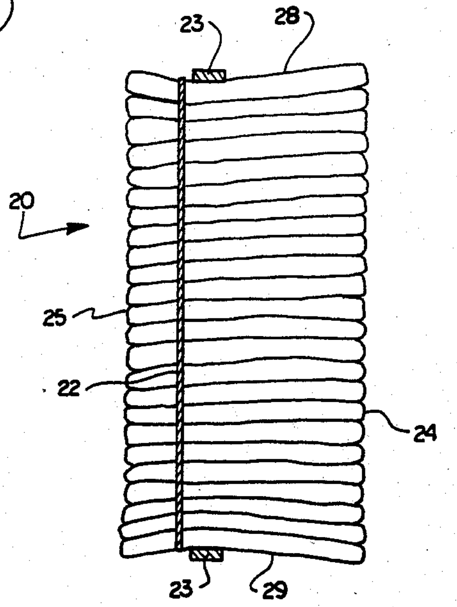
FIG. 2
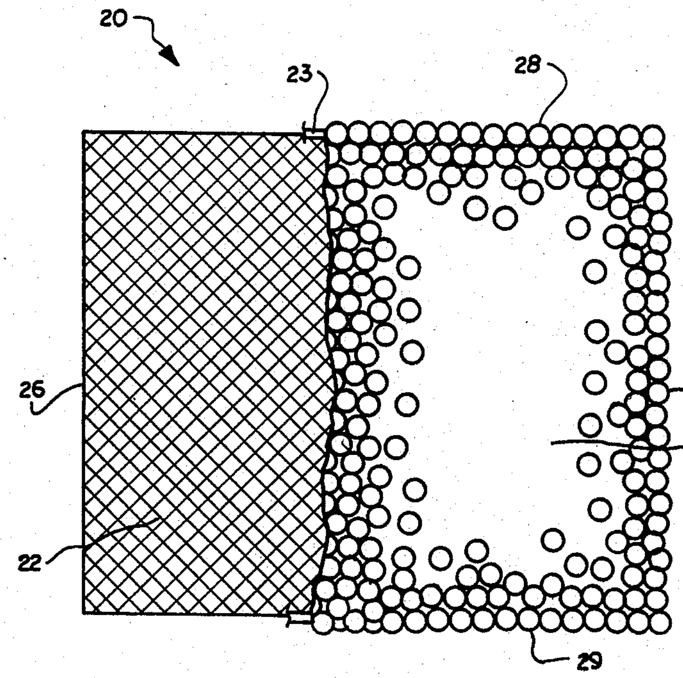
FIG. 3

HIGH-TEMPERATURE FIBROUS INSULATION MODULE

BACKGROUND OF THE INVENTION

This invention relates to systems for insulating the interior of high-temperature furnaces and the like, and especially to insulating systems utilizing ceramic fibers. More particularly, the invention relates to modular lining systems wherein the interior of the furnace is lined with a plurality of individual blocks or modules that are clamped or otherwise fitted together and anchored to the furnace walls and ceiling.

For many years, heat treating furnaces, ceramic kilns, brick kilns, and the like were lined with dense fireclay brick. Later, insulating firebrick replaced the dense fireclay brick because of its lighter weight and better insulating properties.

More recently, ceramic fiber material made of alumina-silica fibers formed into blankets has replaced the insulating firebrick as the lining for such furnaces and kilns. The latest advance in the art is the use of modular units in which the ceramic fiber blankets are assembled and attached to the steel frame defining the furnace or kiln.

This type of arrangement is shown in the following patents:

| U.S. Pat. No. | Inventor | Date |
|---|---|---|
| 3,819,468 | Sauder et al. | 6-25-74 |
| 3,832,815 | Balaz et al. | 9-3-74 |
| 3,854,262 | Brady | 12-17-74 |
| 3,892,396 | Monaghan | 7-1-75 |
| 3,940,244 | Sauder et al. | 2-24-76 |
| 3,952,470 | Byrd | 4-27-76 |
| 3,993,237 | Sauder et al. | 11-23-76 |
| 4,001,996 | Byrd | 1-11-77 |
| 4,012,877 | Byrd | 3-22-77 |
| 4,088,825 | Carr | 5-9-78 |
| 4,120,641 | Myles | 10-17-78 |
| 4,202,148 | Frahme et al. | 5-13-80 |
| 4,222,337 | Christiansen | 9-16-80 |
| 4,246,852 | Werych | 1-27-81 |
| 4,240,023 | Dunlap | 2-3-81 |
| 4,287,839 | Leverin et al. | 9-8-81 |
| 4,336,086 | Rast | 6-22-82 |
| 4,429,504 | Hounsel et al. | 2-7-84 |
| 4,440,099 | Bracket | 4-3-84 |
| 4,449,345 | Hounsel et al. | 5-22-84 |
| 4,473,015 | Hounsel | 9-25-84 |

One difficulty with these ceramic fiber modules is that the fiber blanket portions or blocks tend to shrink lengthwise when exposed to high-temperatures (e.g., from 1400° F. to 3100° F.) so that gaps are formed between the ends of the blankets or modules and the insulating effect of the insulation system is drastically reduced.

The ceramic fiber insulating module construction of the present invention, however, reduces the difficulties indicated above and affords other features and advantages heretofore not obtainable.

SUMMARY OF THE INVENTION

It is among the objects of the present invention to provide a ceramic fiber insulating module for a furnace lining system wherein any shrinkage of the fibers will not result in the formation of gaps between adjacent modules.

Another object of the invention is to provide a ceramic fiber insulating module that affords improved insulation and mechanical strength.

These and other objects and advantages are obtained with the insulating module of the invention, which forms part of an insulating system for lining the walls of high-temperature furnaces or the like. The module comprises a plurality of ropelike lengths assembled in side-by-side relation to form a building module. The ropelike lengths are formed of ceramic fibers spun into strands or cords and then twisted or braided into a rope or other elongated ropelike product. The rope is cut into equal lengths that are retained in a tightly bundled condition to define a generally rectangular block. The ends of the fibers define an inwardly facing planar surface of said module. The fibers are in a generally perpendicular orientation relative to the adjacent wall or ceiling of the furnace so that any shrinkage caused by high temperature occurs in a direction normal to the furnace wall or ceiling and does not produce gaps between adjacent modules.

BRIEF DESCRIPTION OF THE DRAWINGS

FIG. 1 is a fragmentary, perspective view illustrating a plurality of ceramic fiber modules embodying the invention in assembled relation adjacent a furnace wall;

FIG. 2 is a sectional view illustrating the construction of a ceramic fiber insulating module embodying the invention;

FIG. 3 is a front elevation of a ceramic fiber module embodying the invention, with parts broken away and shown in section for the purpose of illustration;

DESCRIPTION OF THE PREFERRED EMBODIMENT

Figure 4:
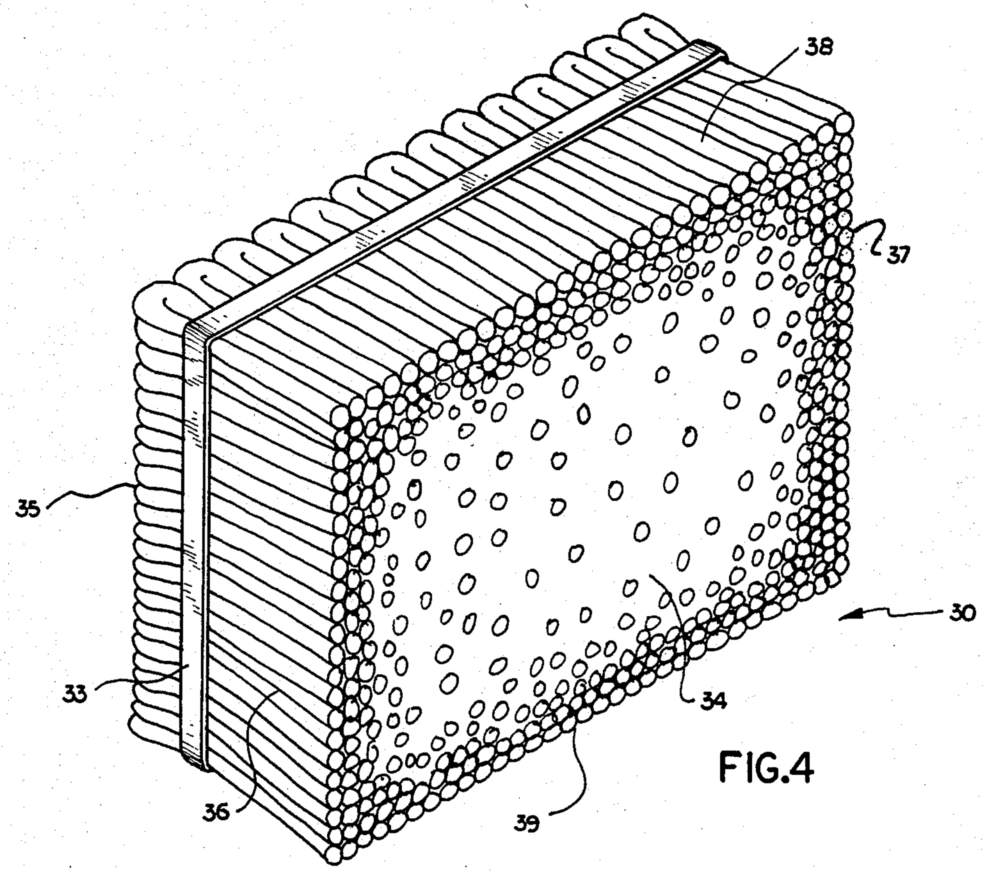
FIG. 4 is a perspective view showing a modified form of ceramic fiber module embodying the invention.

Referring to FIG. 1, there is shown a portion of a heat treating furnace with a vertical steel wall 10 and an insulating lining 11 formed of a plurality of rectangular ceramic fiber blocks or modules 20. The modules typically have dimensions of 12 inches on sides and ends and from 4 to 12 inches in depth. They are assembled, for example, in the manner illustrated in FIG. 1; however, as will be apparent to those skilled in the art, a great variety of different shapes and sizes may be used to achieve a continuous lining of a desired thickness.

The insulating modules 20 are formed of individual ropelike lengths of rope formed of ceramic fibers. The ceramic fibers may be, for example, alumina-silicate ($Al_2SiO_3$) or similar high-temperature ceramic fibers of a high insulating capability. The fibers are twisted together to form strands, using techniques well known in the art, and then the resulting strands or cords are braided, plaited, twisted, or otherwise assembled to form ceramic fiber rope or other elongated product, readily available in the art, such as the twisted ceramic rope manufactured by Pars Manufacturing Company of Ambler, Pennsylvania, in sizes ranging from ¼" to 2".

As indicated, the ceramic fiber rope is cut into equal lengths, such as 8-inch lengths, and the resulting lengths are bundled together parallel to one another, as approximately illustrated in FIG. 2, to form, for example, a rectangular block or module. The formation may utilize a base member in the form of steel screen or mesh 22 to which the ends of the rope lengths can be anchored to secure the rope lengths in assembled relation. The resulting block or module 20 has the ends of the fibers all terminating at and defining a planar front face 24. Thus, the fibers extend generally normal to the wall 10 so that any shrinkage due to high temperature occurs in a direction perpendicular to the insulating lining of the furnace. There is no shrinkage in a direction parallel to the adjacent wall or ceiling, so that the joint between the adjacent modules remains snug regardless of temperature. A perimetric band 23 may be used to pack the rope lengths together fairly tightly for packaging purposes. The band 23 is normally removed, however, during assembly.

The rectangular block or module thus assembled has, as well as the front face 24, end faces 26 and 27 and top and bottom faces 28 and 29, as well as a rearward face 25 that is placed adjacent the steel furnace wall 10.

Any number of means available may be used to secure the individual modules to one another and to the furnace wall 10, such as the means shown in the patents listed below.

| U.S. Pat. No. | Inventor | Date |
|---|---|---|
| 3,832,815 | Balaz et al. | 9-3-74 |
| 3,892,396 | Monaghan | 7-1-75 |
| 3,993,237 | Sauder et al. | 11-23-76 |
| 4,088,825 | Carr | 5-9-78 |
| 4,248,023 | Dunlap | 2-3-81 |
| 4,336,086 | Rast | 6-22-82 |
| 4,379,382 | Sauder | 4-12-83 |
| 4,429,504 | Hounsel et al. | 2-7-84 |

Figure 5:
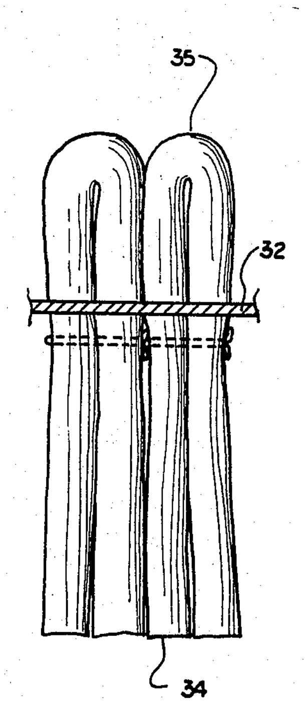
FIG. 5 is a fragmentary, sectional view on an enlarged scale of the ceramic fiber module of FIG. 3.

FIG. 5 illustrates a modified form of ceramic fiber insulating module embodying the invention, wherein the module 30 is formed of ropelike lengths formed of the same rope material, for example, as illustrated and described with respect to the embodiment of FIGS. 1 through 4, but with the individual lengths being about twice as long. The double lengths are then looped and either stapled or otherwise secured to a stainless steel screen or mesh. This method of construction may be desirable in some applications where the lengths can be better secured, using the loop-type techniques which are well known in the art.

Here again, the rope lengths define a rectangular module having a front face 34 that is defined by the ends of the individual fibers. The module also has a rear face 35 defined by the looped portions of the ropelike lengths, side faces 36 and 37, and planar top and bottom faces 38 and 39.

It is also comtemplated that an elongated, ropelike length with a series of continuous loops may be used to construct a module in accordance with the invention.

The unique construction of the ceramic fiber module as illustrated and described provides a resulting assembly wherein any shrinkage that occurs in the ceramic fibers occurs in a direction normal to the face of the furnace and will not result in gaps between individual modules that would permit transfer of heat to the furnace wall and thus defeat the purpose of the insulating system.

While the invention has been shown and described with respect to specific embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. An insulating module for lining a wall of a high-temperature furnace or the like, comprising:
   - a plurality of lengths of rope assembled in side-by-side relation to form a building module;
   - said lengths being formed of twisted ceramic fibers spun into strands that are plaited, twisted or braided into a rope; and
   - means for retaining said lengths of said module in a tightly bundled condition whereby the assembled lengths define a planar front face of said module, said fibers being in a generally perpendicular orientation relative to said front planar face.

2. An insulating module as defined in claim 1, wherein said means for retaining said lengths comprises a perforate sheet element at the rearward portion of said module to which said lengths are secured.

3. An insulating module as defined in claim 1, wherein said lengths are looped at the midpoint whereby both ends thereof lie in said planar front face.

4. An insulating module as defined in claim 3, wherein the looped portions of said lengths are stapled to said retaining means.

5. An insulating module as defined in claim 1, wherein said lengths are cut from twisted ceramic fiber rope.

6. An insulating module as defined in claim 1, wherein said lengths are cut from braided ceramic fiber rope.

7. An insulating module as defined in claim 2, wherein said perforate sheet element comprises steel screen.

8. An insulating module as defined in claim 2, wherein said perforate sheet element comprises expanded steel sheet material.

9. An insulating module as defined in claim 1, wherein said ceramic fibers comprise $Al_2SiO_3$.

10. An insulating module as defined in claim 1, wherein said module is rectangular.

* * * * *